3,377,175
PRESERVATION OF COATINGS
Paul A. Wolf, Millard M. Kent, and Francis J. Bobalek, Midland, Mich., assignors to The Dow Chemical Company, Midland, Mich., a corporation of Delaware
No Drawing. Filed Nov. 1, 1965, Ser. No. 506,010
10 Claims. (Cl. 106—15)

ABSTRACT OF THE DISCLOSURE

A 3-bromo-4-hydroxy-5-loweralkyl phenyl thiocyanate in antimicrobial amount (typically from 0.5 to 3 percent by weight of paint) protects liquid paints, the films from their drying, and like compositions from microbial attack.

---

This invention is concerned with the preservation of coatings and is more particularly directed to methods employing and compositions comprising a brominated phenyl thiocyanate of the formula

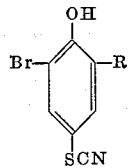

In the above and succeeding formulae, R represents an alkyl radical being of from 1 to 4, both inclusive, carbon atoms. In the present specification and claims, the term "brominated phenyl thiocyanate" is used to refer only to one or more materials of the foregoing definition. The products to be employed in accordance with the present invention are odorless and typically are crystalline solid materials. Representative products include the following: (3 - bromo-4-hydroxy-5-methylphenyl) thiocyanate; (3-bromo-4-hydroxy-5-ethylphenyl) thiocyanate; (3-bromo-4-hydroxy-5-isopropylphenyl) thiocyanate; (3-bromo-4-hydroxy-4-n-butylphenyl) thiocyanate; and (3-bromo-4-hydroxy-5-tert-butylphenyl) thiocyanate.

The brominated phenyl thiocyanate materials, when employed in the methods and compositions of the present invention, afford excellent preservation of coatings against attack by microbial organisms, in particular against attack by organisms causing mildew; this excellent preservation is obtained without the typical deleterious effects exhibited by many known coating preservatives. The present brominated phenyl thiocyanates are particularly stable in typical paint formulations, and the practice of the present invention protects coatings (1) without discoloration, of either the fluid coating or of the resulting film—a factor of considerable importance in the instance of white and other light-colored colors; (2) without contributing an off-odor to the fluid coating or resulting film; and (3) without altering the viscosity of the fluid coating. Moreover, the present preservative protects the fluid or semi-fluid coating prior to application as well as protecting the film after application.

The character of the particular coating with which the present invention is practiced is not critical, inasmuch as it is possible to employ the present invention with all coating compositions, including interior as well as exterior paint compositions, oil-based paints, synthetic latex paints, primers, and compositions, typically thickened, which, while considered as paints, are designed as much to afford an applied and decorative covering, frequently of sufficient depth to permit of surface texturing, as to afford coloring and maintenance of the surface. Hence, in the present specification and claims, the term "coating" is employed in its customary sense to designate a composition comprising a vehicle and a pigment. The term is thus inclusive of the fluid or semi-fluid composition, typically containing solvent in addition to pigment and vehicle, and designed for application to a surface, as well as the resulting dried surface film. Furthermore, the term is also inclusive of compositions which dry with the mere passage of time, commonly called "paints," as well as those of which the drying is hastened by special conditions, such as high temperatures.

The present active agents are employed with good results in the preservation of the increasingly important latex coating compositions. While the term "latex" is not always used with precision, it is generally understood to designate a coating composition in which the vehicle is a synthetic polymer, formed by emulsion polymerization in which process the water of the emulsion serves as solvent. The more common latexes include copolymers of butadiene and styrene, polyvinyl acetate, and polyacrylates.

In carrying out the present invention, conventional paint mixing procedures serve, since the only critical step is the incorporation in a coating of an antimicrobial concentration of one or more of the brominated phenyl thiocyanate compounds. For example, the brominated phenyl thiocyanate active agent can be mixed, preferably with grinding, with the dry pigment prior to the dispersal of the mixture in the remaining ingredients of the ultimate paint formulation. Also, the active agent can be dispersed in a quantity of solvent, which can be an appropriate organic solvent or water, with or without the aid of surface-active dispersing agent, and the resulting dispersion added to the finished paint product or to an incomplete part thereof during the mixing procedure. In this manner of incorporation, the active agent can also be dispersed in the solvent by mechanical grinding to obtain a suspension of active agent in the solvent.

In the instance of latex paint formulations, a convenient manner of incorporation of the active agent is the addition of the active agent to an aqueous dispersion of the synthetic polymer or copolymer which serves as vehicle; thereafter, the necessary pigment and other ingredients are added to complete the paint formulation.

Other variations in the mode of incorporation of the brominated phenyl thiocyanate in paint will be apparent to those skilled in the art.

Any operable concentration of brominated phenyl thiocyanate compound can be employed. In general, good results are obtained when employing the active agent in a concentration in the finished paint of from 0.5 to 3 percent by weight of the finished paint composition. Higher concentrations can be employed; however, they are generally uneconomical and in addition, in some instances, disadvantageously affect the physical properties of the paint.

Typical formulations are employed in the practice of the present invention; thus, coating formulations containing one or more brominated phenyl thiocyanates can contain, in addition to vehicle and pigment, one or more solvents, pigment extenders, plasticizers, surfactants, antifoamers, driers, viscosity-control agents, and the like.

The following examples illustrate the present invention but are not to be construed as limiting.

Example 1

Latex coating compositions are prepared employing, in separate operations for each compound, each of (3-bromo-4-hydroxy-5-methylphenyl) thiocyanate and (3-bromo-4-hydroxy-5-tert.-butylphenyl) thiocyanate.

In these operations, a first composition is prepared by grinding together in a mill the following:

| | Pounds per 100 gallons |
|---|---|
| Water | 255.0 |
| Ethylene glycol | 15.0 |
| Dispersant | 8.5 |
| Antifoamer | 2.0 |
| Viscosity controlling agent | 4.0 |
| Titanium dioxide | 230.0 |
| Extenders | 185.0 |

The grinding is carried out at high speed for a period of about 10–15 minutes. Thereafter, a second composition, having the following composition:

| | |
|---|---|
| Latex (aqueous emulsion of polyacrylate) | 453.0 |
| Defoamer | 5.0 | is mixed and ground at a slower speed with the first composition to form a basic latex paint formulation. A solution of 25 percent by weight of the selected brominated phenyl thiocyanate compound in ethylene glycol is prepared, and an amout of this solution added to the basic latex paint formulation; this amount is sufficient to obtain an ultimate concentration of 0.5 percent of brominated phenyl thiocyanate by weight of ultimate composition. As a result of these operations, coating compositions are obtained, each such composition containing 0.5 percent by weight of one of the brominated phenyl thiocyanates identified in the first paragraph of the instant example.

Example 2

An oil-base commercial paint formulation described as being of the following composition:

| | Pounds per 100 gallons |
|---|---|
| Titanium oxide | 127 |
| Leaded zinc oxide | 424 |
| Extender (aluminum silicates-clays) | 297 |
| Vehicle: | |
|    Linseed oil | 318 |
|    Linseed oil, non-volatile | 107 |
| Drier: | |
|    Lead naphthenate (24% metal) | 12.2 |
|    Manganese naphthenate (6% metal) | 1.6 |
| Mineral spirits | 126 | is procured. This basic oil-base paint formulation is employed in further operations in which a solution of ethylene glycol having dispersed therein 25 percent by weight of (3-bromo-4-hydroxy-5-methylphenyl) thiocyanate is added to the formulation in an amount sufficient to disperse the active agent therein at a concentration of 0.5 percent of ultimate composition.

Examples 3 and 4

The basic oil-base commercial paint formulation described in Example 2 is employed in further operations. In these operations, the formulation is modified in the manner described for the ultimate composition of Example 2 except that (3-bromo-4-hydroxy-5-isopropylphenyl) thiocyanate is employed as active agent in one composition, and (3-bromo-4-hydroxy-5-tert.-butylphenyl) thiocyanate is employed as active agent in another composition.

Example 5

The modified paint compositions of Examples 1–4 are evaluated for stability. In these evaluations, the fluid compositions, freshly prepared and in separate closed containers, are subjected to a temperature of 140° F. for a period of one week. After the one-week period, the compositions are examined to determine stability. More particularly, the compositions are evaluated for any change of color from the original white; for the presence of any odor; and for any change in the viscosity. The results of one particular group of such evaluations are set forth in the following table:

TABLE I.—FLUID PAINT STABILITY

| Test Compound | Latex | | | Oil-base | | |
|---|---|---|---|---|---|---|
| | Color | Odor | Viscosity | Color | Odor | Viscosity |
| (3-bromo-4-hydroxy-5-methylphenyl) thiocyanate. | Very light gray | No change | No change | Light tan | No change | No change. |
| (3-bromo-4-hydroxy-5-isopropylphenyl) thiocyanate. | No change | do | do | Very light tan | do | Do. |
| (3-bromo-4-hydroxy-5-tert.-butylphenyl) thiocyanate. | do | do | do | Tan | Slight odor | Do. |

Example 6

The basic latex paint formulation of Example 1 is evaluated for paint film stability simultaneously with an otherwise identical compositon modified by the incorporation therein of 1.0 percent by weight of (3-bromo-4-hydroxy-5-methylphenyl) thiocyanate. The incorporation is carried out as provided in Example 1.

Separate panels are painted with each of the two formulations and the paint permitted to dry. Thereafter, the panels are placed in a tropical chamber in which the temperature is maintained at 80–84° F. and the humidity is maintained at 90–100 percent. Periodically, the panels are removed to ascertain whether any mildew, evidenced by a spotty blackening of the surface, has developed. The panels painted with the unmodified formulation are found to be heavily mildewed and discolored on inspection 2 to 3 weeks following their placement in the tropical chamber; whereas the panels painted with the modified formulation are found to be entirely free of mildew for a period of at least two months following their placement in the tropical chamber.

Example 7

The basic latex paint formulation of Example 1 is modified in the procedures described in Example 1 to obtain three compositions, each of which contains (3-bromo-4-hydroxy-5-methylphenyl) thiocyanate, one in the amount of 0.5 percent, a second in the amount of 1.0 percent, and the third in the amount of 2.0 percent, all percentages based on the weight of total composition. Separate groups of panels are painted with each of the three compositions and permitted to dry. Other panels are painted with the basic latex paint formulation and permitted to dry, to serve as a control.

Also, the basic oil-base paint formulation of Example 2 is modified by dilution with a commercial undercoat formulation. This latter formulation is described as comprising 43 percent vehicle and 57 percent pigment, the pigment consisting of titanium oxide, basic lead carbonate, and silicates. The dilution is carried out in the ratio of 85 grams of the basis oil-base paint formulation of Example 2 to 15 grams of the commercial undercoat formulation. This dilution has the effect of reducing the concentration of zinc oxide pigment, which pigment, in the excess amount found in the basic formulation, tends to confer antimicrobial properties not found at the lower rates resulting from the dilution.

A portion of the diluted oil-base formulation is thereafter subsequently modified by incorporation therein of (3-bromo-4-hydroxy-5-methylphenyl) thiocyanate to prepare three compositions: one containing the compound in the amount of 0.5 precent, a second in the amount of 1.0 percent, and the third in the amount of 2.0 percent, all percentages based on the weight of total composition. Thereafter, separate groups of panels are painted with each of the three compositions and permitted to dry. Other panels are painted with the diluted oil-base formulation and permitted to dry, to serve as a control.

All panels are then placed outdoors in a subtropical climate of generally high temperatures and high humidity. The panels are placed in a northerly exposure in a nearly vertical position, so as to be advantageous to fungal development, in particular, mildew development. The panels are examined approximately monthly during the mildew season for the presence of discoloration, odor, and other indicators of mildew attack. The results of the examinations, expressed as the number of months of mildew-free exposure, are set forth in the following table:

TABLE II

|  | Months of Mildew-free Exposure | |
| --- | --- | --- |
|  | Latex | Oil-Base |
| Control | 1-2 | 1-2 |
| (3-bromo-4-hydroxy-5-methyl-phenyl) thiocyanate: | | |
| 0.5% | 4-7 | 7-9 |
| 1.0% | >19 | 12-16 |
| 2.0% | >19 | 16-19 |

At the end of nineteen months of exposure, the test is terminated; at this time, no mildew has yet appeared on the panels described above as >19.

Example 8

In yet other operations, (3-bromo-4-hydroxy-5-methylphenyl) thiocyanate is incorporated in an alkyd paint formulation. In these operations, a basic commercial alkyd paint formulation described as being of the following approximate composition

| | Pounds per 100 gallons |
| --- | --- |
| Titanium dioxide | 300 |
| Talc | 315 |
| Long oil alkyd, 80% solid | 350 |
| Drier: | |
|     Lead naphthenate (24% metal) | 6.9 |
|     Manganese naphthenate (6% metal) | 1.4 |
| Heavy mineral spirits | 215.0 | is procured. Thereafter, a solution of ethylene glycol having dispersed therein 25 percent by weight of (3-bromo-4-hydroxy-5-methylphenyl) thiocyanate is added to the basic formulation in an amount sufficient to disperse the brominated phenyl thiocyanate therein at varying concentrations for each of three resulting compositions: one in which the brominated phenyl thiocyanate is present at a concentration of 0.5 percent, another in which the brominated phenyl thiocyanate is present at a concentration of 1.0 percent, and the third in which the brominated phenyl thiocyanate is present at a concentration of 2.0 percent, all percentages based upon weight of ultimate composition.

Example 9

The basic alkyd paint formulation of Example 8 and the three modified alkyd paint compositions of Example 8 are evaluated in the procedures of Example 7 for mildew resistance. The results are set forth in the following table:

TABLE III

| | Months of mildew-free exposure |
| --- | --- |
| Control | <2 |
| (3-bromo-4-hydroxy-5-methylphenyl) thiocyanate: | |
| 0.5% | 3-4 |
| 1.0% | 5-7 |
| 2.0% | 5-7 |

The brominated phenyl thiocyanate compounds to be employed in accordance with the present invention are prepared by reacting a phenol compound of the formula

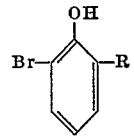

with sodium thiocyanate in methanol saturated with sodium bromide. Thereafter, a solution of bromine in methanol saturated with sodium bromide is added portionwise over a period of time. Separation and, if desired, purification, are conducted in conventional manners.

We claim:
1. In combination, (1) a coating composition comprising a pigment and a vehicle and, as an additive to said composition, (2) an antimicrobial amount of a brominated phenyl thiocyanate of the formula

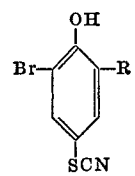

wherein R represents an alkyl radical being of from 1 to 4, both inclusive, carbon atoms.

2. The substance of claim 1 wherein the additive is present in a concentration of from 0.5 to 3.0 percent by weight of the total substance.

3. The substance of claim 1 wherein the brominated phenyl thiocyanate compound is (3-bromo-4-hydroxy-5-methylphenyl) thiocyanate.

4. The substance of claim 1 wherein the brominated phenyl thiocyanate compound is (3-bromo-4-hydroxy-5-isopropylphenyl) thiocyanate.

5 The substance of claim 1 in which the vehicle is a synthetic latex.

6. The method for preserving a coating composition comprising a pigment and a vehicle which comprises the step of dispersing in a solvent solution of the composition an antimicrobial amount of a brominated phenyl thiocyanate of the formula

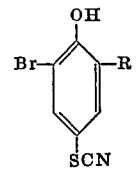

wherein R represents an alkyl radical being of from 1 to 4, both inclusive, carbon atoms.

7. The method of claim 6 wherein the brominated phenyl thiocyanate is dispersed in the solvent solution in a concentration of from 0.5 to 3.0 percent by weight of resulting dispersion.

8. The method of claim 6 wherein the brominated phenyl thiocyanate is (3-bromo-4-hydroxy-3-methylphenyl) thiocyanate.

9. The method of claim 6 wherein the brominated phenyl thiocyanate is (3-bromo-4-hydroxy-5-isopropylphenyl) thiocyanate.

10. The method of claim 6 wherein the vehicle is a synthetic latex.

References Cited

UNITED STATES PATENTS 3,093,603 6/1963 Gilchrist _____ 106—15 X
3,328,243 6/1967 Wolf et al. _____ 260—454 X ALEXANDER H. BRODMERKEL, *Primary Examiner.*

L. B. HAYES, *Assistant Examiner.*